United States Patent
Green et al.

(10) Patent No.: US 9,316,496 B2
(45) Date of Patent: Apr. 19, 2016

(54) POSITION DETERMINATION METHOD AND GEODETIC MEASURING SYSTEM

(75) Inventors: Alastair Green, Rebstein (CH); Daniel Nindl, Feldkirch (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1308 days.

(21) Appl. No.: 13/131,842

(22) PCT Filed: Nov. 12, 2009

(86) PCT No.: PCT/EP2009/065049
§ 371 (c)(1),
(2), (4) Date: Aug. 8, 2011

(87) PCT Pub. No.: WO2010/063545
PCT Pub. Date: Jun. 10, 2010

(65) Prior Publication Data
US 2011/0285592 A1 Nov. 24, 2011

(30) Foreign Application Priority Data
Dec. 3, 2008 (EP) .................................... 08170621

(51) Int. Cl.
*G01C 3/32* (2006.01)
*G01C 15/00* (2006.01)
(Continued)

(52) U.S. Cl.
CPC ................ *G01C 3/32* (2013.01); *G01C 15/002* (2013.01); *G01S 13/74* (2013.01); *G01S 13/75* (2013.01); *G01S 13/865* (2013.01); *G01S 17/42* (2013.01)

(58) Field of Classification Search
CPC ...... G01C 15/002; G01C 3/32; G01S 5/0268; G01S 5/14; G01S 13/74; G01S 17/08; G01S 17/42
USPC ......................................................... 342/458
See application file for complete search history.

(56) References Cited

U.S. PATENT DOCUMENTS 4,534,629 A * 8/1985 Bogle et al. ................... 352/140
6,104,337 A    8/2000 Coutts et al.
(Continued)

FOREIGN PATENT DOCUMENTS

CN    2329013 Y  *  7/1999
DE    19710722      10/1997
(Continued)

OTHER PUBLICATIONS

Circumcircle. (2008). In The Penguin dictionary of mathematics. Retrieved from http://search.credoreference.com/content/entry/penguinmath/circumcircle/0.*

(Continued)

*Primary Examiner* — Gregory C Issing
*Assistant Examiner* — Fred H Mull
(74) *Attorney, Agent, or Firm* — Maschoff Brennan

(57) ABSTRACT

Position determination method for a target point, using a geodetic measuring device, such as a total station or a theodolite, having a distance and angle measurement functionality, a sighting device, and a first radio module, and using a hand-held data processing device, such as a data logger for the measuring device, having a second radio module. The data processing device is positioned within a specified radius of the target point. As part of the method, a radio connection is established between the first and the second radio modules, and the position of the target point is determined. A rough distance between the first and the second radio modules is determined based on a propagation time of interrogation and/or response signals of the radio connection and is used to locate the target—as displaying, detecting, identifying, and/or sighting the target point—or to exclude further possible target point candidates.

22 Claims, 6 Drawing Sheets

(51) Int. Cl.
*G01S 13/74* (2006.01)
*G01S 13/86* (2006.01)
*G01S 17/42* (2006.01)
*G01S 13/75* (2006.01)

(56) References Cited

U.S. PATENT DOCUMENTS

| | | | |
|---|---|---|---|
| 2002/0186361 A1* | 12/2002 | Ueno et al. | 356/4.01 |
| 2003/0121673 A1* | 7/2003 | Kacyra et al. | 172/1 |
| 2010/0007739 A1* | 1/2010 | Otani et al. | 348/159 |
| 2010/0207820 A1* | 8/2010 | Kawano et al. | 342/393 |

FOREIGN PATENT DOCUMENTS

| | | |
|---|---|---|
| DE | 19926706 | 12/1999 |
| DE | 19949580 | 4/2000 |
| EP | 0 797 076 | 9/1997 |
| EP | 797076 A2 * | 9/1997 |
| EP | 1 686 350 | 8/2006 |
| JP | 02097908 A * | 4/1990 |
| JP | 2005351702 A * | 12/2005 |
| WO | 90/12284 | 10/1990 |
| WO | 98/44363 | 10/1998 |
| WO | WO 2008/029812 A1 * | 3/2008 |

OTHER PUBLICATIONS

English translation of JP 2005351702 A.*
English Translation of CN 2329013 Y.*
L. Firesone et al., Comparison of Autofocus Methods for Automated Microscopy, Cytometry, vol. 12(3), p. 195-206, 1991.*
Localize or localise. (2001). In M. Robinson and G. Davidson (Eds.), Chambers 21st Century Dictionary. London, United Kingdom: Chambers Harrap. Retrieved from http://search.credoreference.com/content/entry/chambdict/localize_or_localise/0.*

* cited by examiner

POSITION DETERMINATION METHOD AND GEODETIC MEASURING SYSTEM

The invention relates to a position determination method for a target point, a geodetic measuring or a geodetic measuring device, and a handheld data processing device for remote control and for acquiring data from a geodetic device.

BACKGROUND

Since antiquity, a multiplicity of geodetic methods and geodetic devices have been known for the purpose of measuring a target point. Here, distance and angle from a measuring device to the target point being measured adopted as spatial standard data and, in particular, the location of the measuring device together with any reference points present are acquired as said standard data.

A generally known example for such measuring devices and/or geodetic devices is provided by the tachymeter or by a total station, which is also denoted as an electronic tachymeter or computer tachymeter. Such a geodetic measuring device of the prior art is described, for example, in publication EP 1 686 350. Such devices have electrosensor angle and distance measurement functions that permit determination of direction and distance to and from a selected target. The angle and distance variables are determined in this case in the internal reference system of the device, and still have to be linked, if appropriate, to an external reference system for an absolute determination of position.

Modern total stations have microprocessors for further digital processing and storage of acquired measured data. As a rule, the devices are produced in a compact and integrated design, coaxial distance and angle measuring elements, as well as arithmetic logic, control and memory units are mostly integrated in one device. Means for motorizing the targeting optics, for reflector-less distance measurement, for automatic target seeking and tracking, and for remote control of the entire device are integrated, depending on the upgrade level of the total station. Total stations known from the prior art further have a radio data interface for establishing a radio link with external periphery components such as, for example, with a data acquisition device that can, in particular, be designed as a handheld data logger, field computer, notebook, minicomputer or PDA. By means of the data interface, it is possible for measured data acquired and stored by the total station to be output for external further processing, for externally acquired measured data to be read into the total station for the purpose of storing and/or further processing, for remote control signals to be input and/or output for the remote control of the total station or of a further external component, particularly in mobile use in the field, and for control software to be transcribed into the total station.

The measuring accuracy attainable in the measuring operation varies depending on the design of the target point to be measured. If, however, the target point is represented by a target reflector specifically designed for measurement—such as a panoramic prism—it is therefore possible to achieve substantially more accurate measurement results than given in a reflector-less measurement, for example in relation to a point to be measured on a house wall. The reason for this is, inter alia, that the cross section of the emitted optical measurement beam is not punctiform but two-dimensional, and therefore scattered measuring radiation is received not only at the target point actually to be measured, but also from points in the immediate surroundings of the field of view of the target point to which the measuring radiation is likewise applied. For example, the roughness of the surface of the point to be measured influences the accuracy of reflector-less measurements in a known way.

In addition, such geodetic devices mostly have a sighting device for sighting or aiming at target points. In a simple design variant, the sighting device is designed, for example, as a target telescope. Modern devices can, moreover, have a camera for acquiring an image that is integrated in the target telescope and is aligned, for example, coaxially or in parallel, it being possible for the acquired image to be displayed, in particular, as a live image on a display of the total station, and/or on a display of the peripheral device—such as a data logger—used for the remote control. The optics of the sighting device can in this case have a manual focus—for example, a setting screw for varying the focal position of the optics—or have an autofocus, the focal position being varied, for example, by servomotors. Automatic focusing devices for target telescopes of geodetic devices are known, for example, from DE 19710722, DE 19926706 or DE 19949580.

The optical system of the sighting device includes, in particular, an objective lens group, a focusing lens group and an eyepiece, which are arranged in this sequence starting from the object side. The position of the focusing lens group is set as a function of the object distance so as to result in a sharp object image on a reticule arranged in the focusing plane. Said object image can then be observed through the eyepiece, or recorded with the aid of a coaxially arranged camera.

In the case of a known sighting telescope with an autofocus system, directly after the AF start key has been pressed then the focusing lens group is moved from the respective position into another position in order to focus a sighted object.

With a phase difference detection system, a point first detected is regarded as the current focal point of the sighted object so that the autofocus system moves the focusing lens group into an axial position that corresponds to this focal point, whereupon the focusing lens group is stopped.

With such an autofocus control, there is a need to align the target telescope with the target before carrying out the autofocus process. In addition, when a target prism is automatically focused either the mount holding the prism, or an image reflected at the prism is focused. It follows that which of the two images (an image of the mount or an image of the telescope) is to be focused with the autofocus system is not determined reliably. In particular, the front side of the object lens of the sighting telescope can be seen as a dark image, while the contrast of the telescope housing is generally strong, and so the telescope is often deflectively focused on its own image reflected at the prism, and not focused on the prism.

By way of example, a total station is set up in terrain in the case of a typical one man measurement task with a target reflector. The user moves a handheld measuring rod, which carries the target reflector, onto a target point to be measured, whereupon the position of the target reflector, and thus of the target point, can be determined as follows. The total station is remotely controlled, in particular, by the user carrying the measuring rod, this being done by means of a data logger linked to the total station by radio. The data logger can in this case be fitted on the measuring rod equipped with the target reflector, or the user can, in addition, hold it in his hand next to the measuring rod.

The sighting of a target reflector can in this case be performed, in particular, by means of a live image displayed to the user in the data logger display and which is provided by a camera—arranged, for example, coaxially in the target telescope or with an alignment parallel to the target telescope—as sighting device of the total station. Consequently, by using the live image, the user can align the total station correspondingly with the desired target detectable in the live image.

However, if the live image is not focused on the target, but on another distance, it can often happen that the target in the live image is able to be detected and identified by the user only with difficulty. Such focusing that is wrong or unsuitable for detecting the target can result because the autofocus function automatically focuses on an object located in the center of the camera image. Before the target is detected and sighted, it is, however, generally located not in the center of the image, but in the periphery of the image, and this leads to the focusing that is unsuitable for the user. Consequently, of greater ease in detecting and identifying the target it has so far been possible for a complicated manual refocusing of the camera optics to be necessary for focusing on the target, so that the total station can thereupon be aligned with the target that can be detected in focus in the image.

If the geodetic measuring device has an automatic target search function in the case of which a large field of view region of the measuring device is scanned, for example by means of a rotating, vertically spread measurement beam, the target reflector can be found automatically in the field of view of the total station. However, problems can arise, particularly when identifying the target reflector, during such an automatic search. For example, it also happens in this case that false reflections which cannot be unambiguously distinguished from the reflection of the target reflector that is actually to be measured are recorded from further reflectors in use on a building site for measuring purposes, or else from further reflecting objects, such as automobile lights or glass panes, lying in the field of view region of the total station. To date, this has mostly required a user to identify one of the recorded reflections as that of the target reflector reflection in a complicated and reliable way.

It can also happen in the case of automatic target tracking of a target reflector that the total station loses the target reflector from the sight. Here, as well, an automatic target search can be carried out in order to find the target reflector again, an occurrence of the above described problems being possible in the identification of the target reflector from the set of reflecting objects recorded in the target search, which represent all target point candidates coming into consideration as target point.

As regards reflectorless measurements relating to sighted target points, further problems can arise in addition when further objects lying close to the actual sighted target object are located in the field of view of the measuring device. It can happen in this case when measuring radiation is also applied to the further objects, and that a portion of measuring radiation that is scattered on these objects is received. Admittedly, it is then possible in principle to determine the several distances from the respective components of the measuring radiation that are backscattered by the various objects, but it is necessary nevertheless to identify the distance from the target object actually to be measured, and to assign the distance sought to the target object. In the case of total stations of the prior art, such identification and assignment likewise mostly have to be carried out by a user, and are therefore complicated and subject to error.

SUMMARY

One object of the invention is to provide an improved position determination method for a target point that is to be measured with the aid of a geodetic device. In particular, in this case the position determination method is to be suitable for a one man measurement task.

A further object of the invention is to facilitate identification of the desired target. In particular—even before the target is sighted—it is to be possible for this purpose for a live image provided by a camera of the measuring device to be focused on the target more quickly and in an automated fashion so that an improved detectability of the target can be ensured.

In addition—particularly in the context of an automatic target search operation by means of a spread laser beam—the aim of the invention is to enable an easier identification of the target point reflection from a set of reflections produced by further objects.

A further object is to provide an improved measuring system—particularly with regard to a simplified identification of the target point—for determining the target point position, and to provide a measuring device and a data processing device for such a measuring system.

These objects are achieved by the implementation of the characterizing features of the independent claims. Features that develop the invention in an alternative or advantageous way are to be gathered from the dependent patent claims.

In particular, the detection and/or identification of the desired target point to be measured are/is facilitated and/or automated in the inventive position determination method for a target point with the aid of a geodetic measuring device. Various embodiments having different automation levels for the identification of the target can be implemented in this case, depending on the upgrade level of the measuring device—such as, for example, a total station or a theodolite. In particular, the position determination method relates to a one man measurement task, it being the desire of the geodetic to measure one or more points in the terrain. The measuring device, which has a distance and angle measurement function as well as a sighting device, is set up to this end in the terrain. Here, the measuring device can be remotely controlled by a handheld data processing device, in particular a data logger or a field computer. In addition, the data processing device is preferably designed to display, store and/or further process recorded measured data. The geodetic measuring device and the handheld data processing device respectively have a radio module for the purpose of communicating data between them.

In order to determine position, the geodetic can carry on a target point to be measured a handheld measuring rod that carries a target reflector. The geodetic measuring device is remotely controlled with the aid of the data processing device, which is, for example, mounted on the measuring rod.

However, there is still a need to identify and sight the target before the target point position is determined, and this can be associated with problems described at the beginning.

Since—particularly in the context of such a one man measuring task—the measuring rod with the target point to be measured and the handheld data processing device must be operated by one and the same user, the data processing device is spatially linked to the target point. The data processing device is located within a prescribed, relatively narrow circumcircle around the target point. By way of example, the circumcircle is bounded by the operator's arm length and/or by the dimension of the measuring rod.

According to the invention, a propagation time of interrogation and/or response signals of the radio link between a first and second radio module of the measuring device and/or of the handheld data processing device and is used to determine an approximate distance between the two radio modules, and this approximate distance is used for target localization—that is to say by displaying, detecting, identifying and/or sighting the target point. Measuring or locating the target point can thereby be facilitated and/or automated.

By way of example, an identification of the target point from a candidate set of target point candidates whose distances from the measuring device are respectively known—in particular, measured—can be performed with less outlay—for example, in a partially or completely automated fashion—by evaluating the distances with the aid of the approximate distance. In particular, here the known or measured target point candidate distances are filtered as a function of the approximate distance (10).

According to the invention, the approximate distance can likewise be used for an automatic focus function of the sighting device of the geodetic measuring device so that automatic focusing is performed as a function of the approximate distance. Consequently, the target to be measured can be immediately and automatically focused—at least coarsely—in the sight and thereby more effectively detected, identified and sighted. For example, the sighting device has a camera that is arranged coaxially or in parallel with a target telescope and whose live image—automatically focused at the approximate distance, in accordance with the invention—can be provided for the user on a display of the data processing device. The user is, inter alia, to detect and control the target in a quicker and easier fashion.

In particular, a focal position of an optics of the sighting device is set automatically—in particular by servomotors—in such a way that the sighting device is focused at the approximate distance.

Alternatively, in the course of controlling the focus it is, however, possible to use the approximate distance solely to remove ambiguities—of which object or image is the automatic focusing to be performed. For example, in the case of automatic focusing of a target prism by autofocus devices known from the prior art, either the mount holding the prism, or an image reflected on the prism is focused. Since the approximate distance corresponds roughly to the distance from the target prism, it is now possible by comparing the two values to take a correct decision as to the object or image that is to be focused so that the prism can be reliably focused, and wrongly focusing on the image reflected in the prism can be prevented.

A further aspect of the invention relates, in particular, to an automatic search operation of a field of view region of the measuring device for reflecting objects that represent the target point candidates. The function of such an automatic search operation, a vertically spread laser beam being, for example, emitted in a fashion pivoted over a horizontal angle range, is integrated in most modern optoelectronic geodetic measuring devices. Also lying in the field of view region of the device that is scanned is the target point, but the later is not yet identified as such among the reflecting objects coming into consideration for this. In the course of the search operation, the measuring device is used to determine positions of the reflected points that come into consideration as candidates for the target point by at least measuring target point candidate distances from the measuring device in relation in each case to the target point candidates.

It is necessary thereupon to identify the target point from the set of the target point candidates for which a position is respectively determined, and to assign a corresponding position to the target point.

In the course of the described method, it follows that a succession of positions are determined in relation to reflecting objects, in particular in an automatic and highly precise fashion, the position of the target point being sought also being included. However, it is not yet known in this case which of the emitted positions embodies the target point position.

In accordance with the invention, for identification purposes an approximate distance is now determined from the geodetic measuring device to a data processing device that is located within a prescribed, maximum permissible circumcircle around the target point and is linked by radio to the geodetic measuring device. The determination of the approximate distance is performed in this case by evaluating interrogation and/or response signals of the radio link using the signal propagation time principle. Since the data processing device is necessarily positioned close to the target point, in particular being fastened on a reflector rod having the target point, the approximate distance determined in such a way from the first to the second radio module can likewise be considered as the approximate distance from the geodetic measuring device to the target point. Depending on the position of the data processing device relative to the target point, there is a variation in the deviation of the approximate distance from the actual distance of the target point in relation to the measuring device, so that positioning the data processing device as closely as possible around the target point increases the probability of correctly identifying the target point from the target point candidate set, and reduces errors in the identification.

The identification per se is performed in this case by, in particular, selecting target point candidates whose distances determined by the geodetic measuring device lie within a prescribed, maximum permissible deviation range of the value of the approximate distance. Candidates whose specific distance deviates substantially from the approximate distance are then excluded from the identification of the target point, that is to say they are not considered. Here, the maximum permissible deviation range can be defined, for example, as a function of a measuring accuracy for the determination of the approximate distance, and/or as a function of the position of the data processing device relative to the target point. In particular, the definition of the maximum permissible deviation range by means of which candidates coming into consideration as target point are filtered, can be prescribed as a function of the maximum permissible circumcircle around the target point prescribed for the positioning of the data processing device.

In addition to the filtering of the target point candidates performed for identification, it is, for example, possible to calculate and specify for each of the preselected candidates a probability, that is to say a certainty, for the identification as the target point. Appropriate mathematical methods for this are known to the person skilled in the art.

As a further example of the use of the approximate distance for identification purposes, it is also possible to identify as the target point that target point candidate of the candidate set whose measured distance lies closest to the value of the approximate distance. If, for example, with the exception of one target point candidate distance all further measured target point candidate distances deviate substantially from the approximate distance, it is possible for the identification of the target point as one candidate whose distance lies close to the value of the approximate distance to be regarded as being determined with relative reliability.

In accordance with a further embodiment of the invention, the determined approximate distance can also be used supportively in the context of a target tracking function of the geodetic measuring device. Such target tracking controls are already integrated in some modern total stations and are known sufficiently to the person skilled in the art. The object of the function is to track a moving target reflector continuously by means of the total station and to permanently determine a current position of the target. However, this can lead to a loss of the optical link to the target reflector provided by the measuring beam of the total station, or to a further reflector located in the terrain being wrongly sighted and further tracked.

Since—particularly in the context of a one man measurement task—the geodetic carries the target reflector along together with the data processing device, the approximate distance can be used supportively during automatic target tracking to control the latter, in particular to check the target tracking. For example, an arithmetic logic unit of the target tracking control can be used to permanently check whether the distance from the target reflector that is measured continuously in an optoelectronic fashion by the geodetic device lies within a specific maximum distance range about the approximate distance so that the correct identification of the target reflector can be ensured during the target tracking. Given a substantial deviation of the optoelectronically measured target reflector distance from the approximate distance, something which can occur, for example, upon loss of the optical link from the geodetic device to the target reflector, or given target tracking of a wrong reflector, it is possible, for example, to output a warning signal so that the user can check the target tracking and, if appropriate, initialize it anew.

The geodetic measuring device is, for example, a total station or a theodolite and, for the purpose of providing the radio data communication function, has a first radio module, that is to say a unit that is integrated or can be slipped on, for radio data communication, in particular of measured data with further devices such as the data processing device. Appropriate geodetic measuring devices with a radio module are known from the prior art.

The target point is represented, in particular, by a target reflector, for example a panoramic prism. The data processing device is positioned inside a spatial tolerance environment around the target point—that is to say within a prescribed circumcircle around the target point, and thus in the immediate vicinity of the target reflector. For example, the data processing device can be slipped onto a mast carrying the target reflector, and be operated by a user who carries the target reflector mast, and positions the latter in the terrain at a point to be measured. The prescribed, maximum permissible circumcircle around the target point within which the data processing device is necessarily to be positioned is yielded implicitly substantially, in a simultaneous operation, performed by the user, both of the target reflector defined in the target point, and of the data processing device. Thus, in general the data processing device is no further removed from the target reflector rod than an arms length of the user. As is known from the prior art, the data processing device is designed in particular for fastening, or slipping onto the target reflector rod in order to simplify handling in this case.

The data processing device is preferably designed as a data logger or field computer, and thus for the purpose of detecting, further processing and/or storing total station measured data, and for remote control of a total station. Generic data loggers or data acquisition devices are sufficiently well known from the prior art. This data processing device, that is to say the data logger, in particular, also has a radio data communication function, which is provided by a second radio module. It is therefore possible to establish a radio link for data communication between the first and the second radio module—that is to say between the measuring device and data processing device. As explained above, radio signals of the radio link are used to determine the approximate distance between the two devices, with the aid of which it is possible to facilitate identification, display, detection and/or sighting of a target point located near the data processing device.

The approximate distance determined according to the invention from radio signals between the measuring device and the data processing device is regarded in this case as an approximately determined distance from the geodetic device to the target point.

The evaluation of the interrogation and/or response signals of the radio link that is performed in order to determine the approximate distance can in this case be performed with the aid of methods known from the prior art. In particular, to this end one of the two radio modules can transmit interrogation signals in the form of pulses at a known repetition rate that are answered by the other radio module after a permanently prescribed response delay. These response signals are, in turn, received by the radio module transmitting the interrogation signals. The time interval between the transmission of the interrogation signals and the corresponding response—minus the response delay—is now the propagation time of the radio signals for the distance from the interrogating radio module to the responding radio module, and back. The approximate distance between the two radio modules can now be derived from this determined time interval. This principle has been known for a long time, inter alia from secondary radar technology.

Alternatively, the approximate distance can, however, also be determined with the aid of a single radio signal. For example, if the first and second radio modules can access time information from sufficiently precisely synchronized clocks, a signal—that carries information relating to the transmission time—can be transmitted from the first radio module to the second one, for example. Upon reception, a reception time is determined so that the information transmitted in relation to the transmission time, and the reception time can be used to determine the propagation time of the signal, and the approximate distance between the first and second radio modules can be determined therefrom.

As regards equipment, according to the invention the approximate distance is determined with the aid of an evaluation unit that acquires propagation times for the radio signals. In particular, in this case the first radio module and the second one are designed in this case to cooperate so that interrogation signals in the form of pulses are answered correspondingly by the other radio module. The evaluation unit then derives the approximate distance from the time interval between an interrogation pulse and the corresponding response pulse.

The approximate distance determined in this way, which can usually be determined with an accuracy of a few decimeters with the aid of signal evaluation methods known from radar technology, is passed in accordance with the invention to a component that is suitable for detecting, displaying and/or identifying the target point.

In accordance with one embodiment, a unit is present for identifying the target point from a candidate set measured in advance. For example, the unit is designed as an arithmetic logic unit for carrying out the identification step of the inventive method described above. Alternatively, or in addition, the unit can have a display for displaying the approximate distance so that a user is thereby enabled a process to filter the measured candidate distances, and thus to identify the target point from the candidate set. If the component has an arithmetic logic unit and a display, it is possible, in particular, to display further information derived by the arithmetic logic unit. For example, the selected candidate distances lying within a deviation range, of a maximum permissible size for the identification, about the approximate distance can be displayed together with the value of the approximate distance. It is also possible, in particular, to calculate and specify in each case a difference of the target point candidate distances from the approximate distance. A user can now be enabled thereby to identify the target point from the set of the preselected target point candidates coming into consideration in a simple way.

In accordance with a further embodiment, the component can be provided as a focus control for the sighting device of the geodetic measuring device for the purpose of automatic focusing as a function of the approximate distance. In this case, the focus control can be designed to automatically set a focal position of an optics of the sighting device—in particular by servomotors—in such a way that the sighting device is automatically continuously focused at the currently determined approximate distance.

A target telescope, a camera or a target telescope with an integrated camera, in particular a coaxially arranged one, can be provided on the geodetic device as the sighting device. In this case, an image acquired by the camera and at least approximately focused on the target to be measured can now be transmitted by radio to the data processing device suitable for remote control and be displayed there on a display. This enables the user of the data processing device to detect, identify and sight the target, or to exclude further targets that are present but wrong, in a fashion that is easier and quick.

The evaluation unit can be integrated in the geodetic measuring device or in the data processing device. The same also holds for the possibly present arithmetic logic unit for identifying the target point from the candidate set. In the exemplary case where the evaluation unit is integrated in the measuring device, and the arithmetic logic unit for identifying is integrated in the data processing device, the approximate distance can, for example, be transmitted via the existing radio link to the component for identifying the data processing device thus enabling a user operating the data processing device to identify the target point in a simple way or immediately display the position of the candidate identified as the target point.

Moreover, the invention relates to a computer program product with program code that is stored on a machine readable carrier for the purpose of carrying out the step of identifying the target point from a candidate set of target point candidates whose distances are respectively measured, by evaluating the distances with the aid of an approximate distance in accordance with one of the methods described above, in particular when the program is run in an arithmetic logic unit.

BRIEF DESCRIPTION OF THE DRAWINGS

The inventive method and the inventive device are described below in more detail purely by way of example with the aid of concrete exemplary embodiments illustrated schematically in the drawings, further advantages of the invention also being examined. In detail.

DETAILED DESCRIPTION

Figure 1:
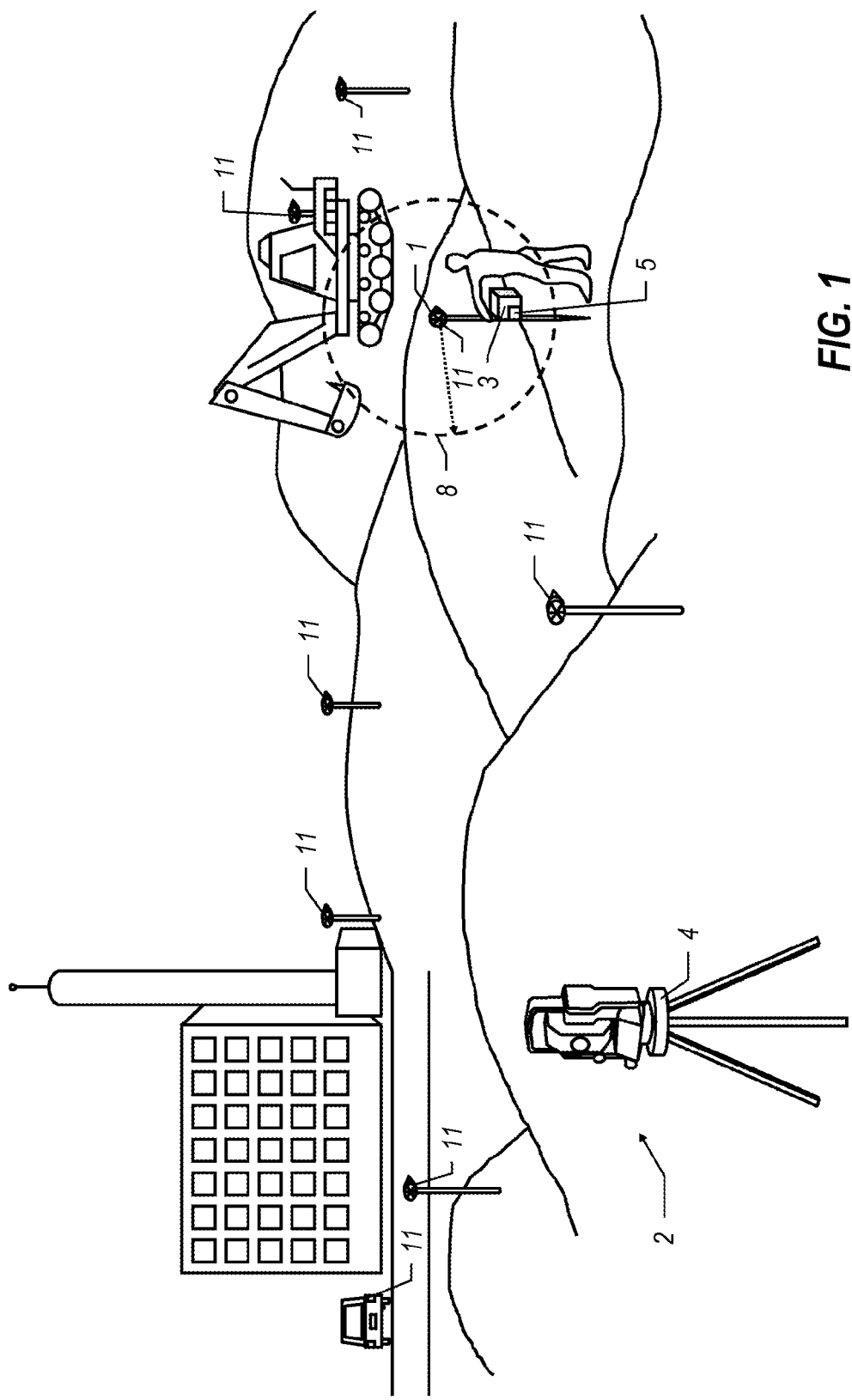
FIG. 1 shows a typical measuring situation in the construction sector.
Figure 2:
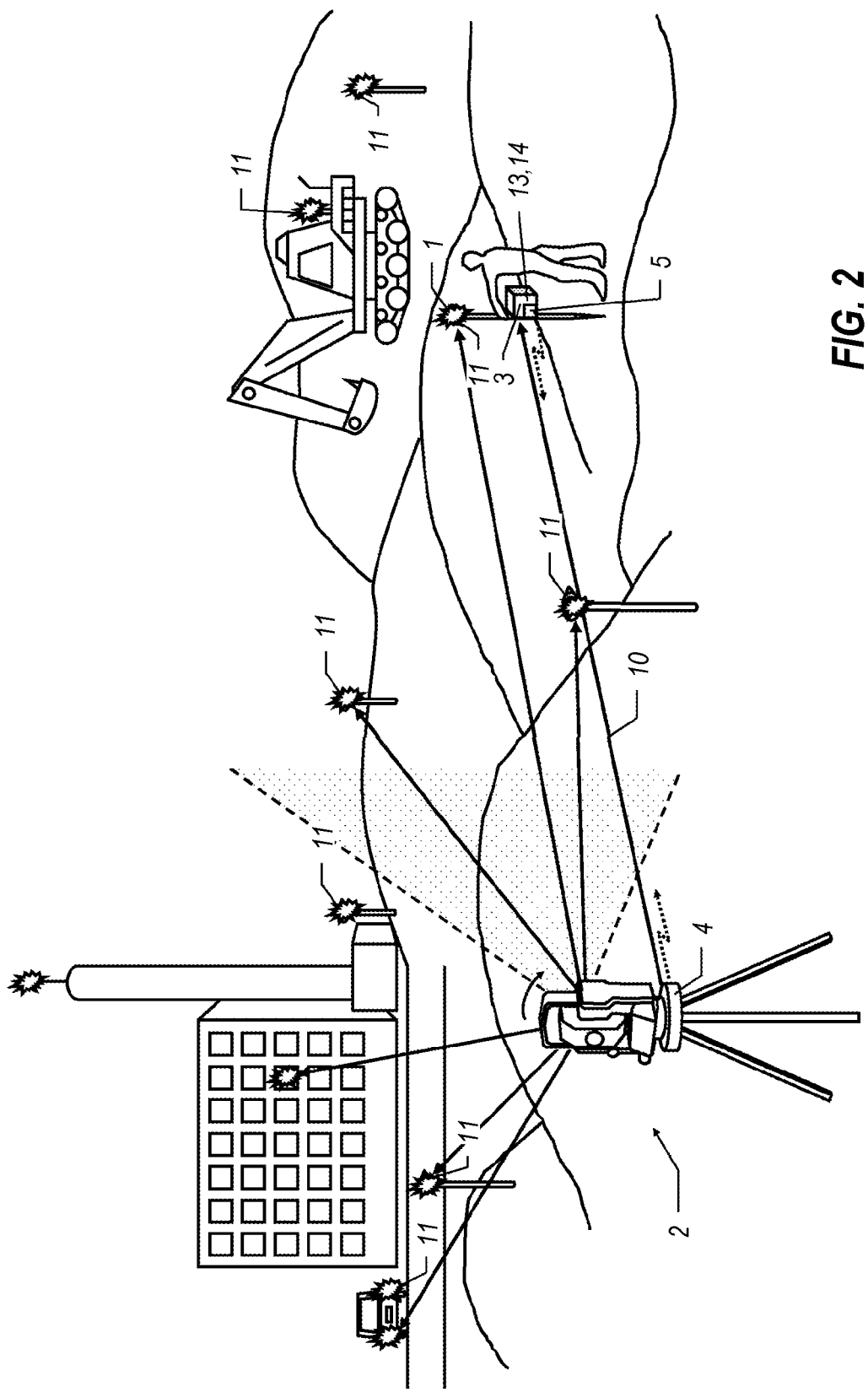
FIG. 2 shows an illustration of a search operation of a total station, measured variables being determined in relation to reflecting objects.
Figure 3:
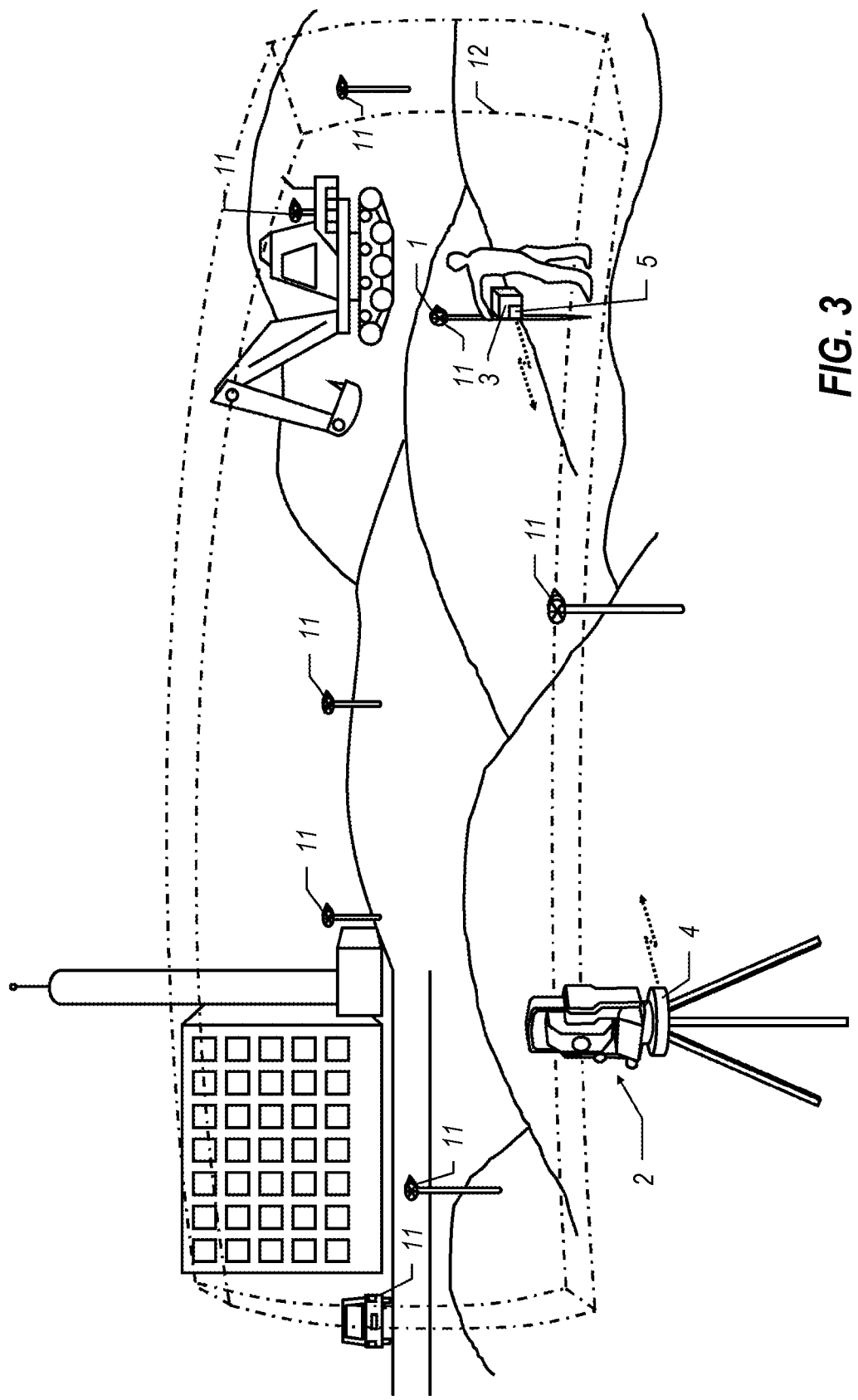
FIG. 3 shows the selection, performed with the aid of the approximate distance, of a distance range coming into consideration for the position of the target reflector.

FIGS. 1 to 3 show a typical measuring situation in the construction sector, the aim being to determine the position of a target point 1 with high precision. To this end, a total station is set up in the terrain as a geodetic measuring device 2. A user moves a handheld measuring rod with the target reflector to the target point 1 to be measured. The total station is controlled remotely by the user carrying the measuring rod by means of a data logger, linked by radio to the total station, as a handheld data processing device 3. The data logger can in this case be fitted on the target reflector rod or, in addition to the measuring rod, also be held in the user's hand. Such a use of the data logger implies a positioning thereof within a prescribed circumcircle 8 of at most approximately 1 to 2 meters radius around the target point 1 to be measured, the maximum permissible circumcircle 8 being visible in FIG. 1.

The data logger and the total station respectively have a radio module 4, 5 for the purpose of radio data communication. Here, the term radio module is to be understood as any means that enable radio communication with further radio devices. Such radio devices and/or total stations and data loggers with a radio modem that is integrated or can be slipped on—that is to say are capable of radio data communication—are adequately known from the prior art.

The total station that is shown as geodetic measuring device 2 further has an automatic target search function in which a certain field of view region of the measuring device 2 is scanned by means of a rotating, vertically spread measurement beam. In this case, the total station records the reflection by the target reflector, but also the disturbing reflections from further reflectors set up, and from further reflecting objects—such as, for example, cats eyes on vehicles. The positions of all the objects that come into consideration as target reflector and produce reflections—and therefore represent target point candidates 11—are now likewise determined in the course of this scanning operation, as is illustrated schematically in FIG. 2. The positions of these target point candidates 11 are determined in this case by an optoelectronic measurement—known from the prior art—of respective target point candidate distances and, in particular, also target point candidate angles, from the total station to the target point candidates 11 in each case.

In accordance with the invention, apart from the actual data communication, the radio module 5 of the data logger now transmits interrogation signals in the form of pulses with a known repetition rate. The interrogation pulses are likewise answered as response signals in the form of pulses by the radio module 4 of the total station after a permanently prescribed response delay. These response signals are received, in turn, by the radio module 5 of the data logger, and the time interval between the transmission of the interrogation signals and the reception of the response signals is determined by an electronic evaluation component 13 that is, for example, integrated in the data logger and is therefore not illustrated separately. Knowing the response delay and the propagation rate of the radio signals, the electronic evaluation unit 13 further uses this time interval to determine an approximate distance 10 between the radio module 5 of the data logger and the radio module 4 of the total station.

Alternatively, further methods known from the prior art can also be applied to determine such an approximate distance 10 from radio signals between the data logger and the total station. Instead of being integrated in the data logger, the evaluation component designed for determining the approximate distance 10 can also likewise be integrated in the total station.

The approximate distance 10 can also be regarded as an approximate distance from the total station to the target point 1 on the basis of the positioning of the data logger in the near circumcircle 8 about the target point 1—in particular, the data logger being fastened on the target reflector rod. According to the invention, the approximate distance 10 determined in such a way can therefore be used to identify the target point 1 from the set of the target point candidates 11 for which a distance from the total station has already been measured precisely in each case. For this purpose, the data logger has a unit 14, in particular an arithmetic logic unit, which, by way of example, is likewise integrated therein and therefore not illustrated separately, and compares the measured target point candidate distances with the determined approximate distance 10.

It is possible, for example, to identify as the target point 1 that target point candidate 11 whose measured target point candidate distance from the set of the measured target point candidate distances lies closest to the value of the approximate distance 10.

Alternatively, the arithmetic logic unit can also select from likely target point candidates 11 for the identification as the target point 1. For this purpose, it is possible to prescribe a maximum permissible deviation range 12 about the value of the approximate distance 10, and to select those target point candidates 11 whose target point distance values lie within this deviation range 12. Target point candidates 11 whose values for the respectively measured distances to the total station deviate from the approximate distance 10 further than permitted can then be excluded from the identification, that is to say filtered out. FIG. 3 shows such a permissible deviation range 12, defined with the aid of approximate distance 10, for filtering the target point candidates 11. It is now possible here to select the target point candidates 11 positioned in this range, and to display them to a user for identification of the target point 1.

In a numerical example, five reflections are recorded purely by way of example by the total station in the course of a search operation, and in the process distances and angles relating to the objects producing these reflections, among which the target point 1 is also to be found—are respectively measured with high precision. 10.424 m, 17.654 m, 24.342 m, 35.684 m and 59.782 m, for example, are determined as distances. By way of example, a value of 18.5 m is determined in the deviation, performed in parallel by evaluating radio link signals, of the approximate distance 10 from the radio module of the total station to the radio module of the data logger, which is positioned near the target point 1. By way of example, if a range of ±2 m about the approximate distance 10 is now defined for identification purposes as the maximum permissible deviation range 12, when the five distances are automatically filtered by the arithmetic logic unit with the aid of the deviation range 12 dependent on the approximate distance 10 only the distance 17.654 m will thus be selected, the other four distances, on the other hand, being discarded. That is to say, in this case the distance 17.654 m is identified as the target point distance being sought, and the solid angle measured in conjunction with this distance should be assigned as the target point angle being sought, so that the target point position can be output or, if appropriate, subsequently provided to the total station for the purposes of automatic target tracking.

Figure 4:
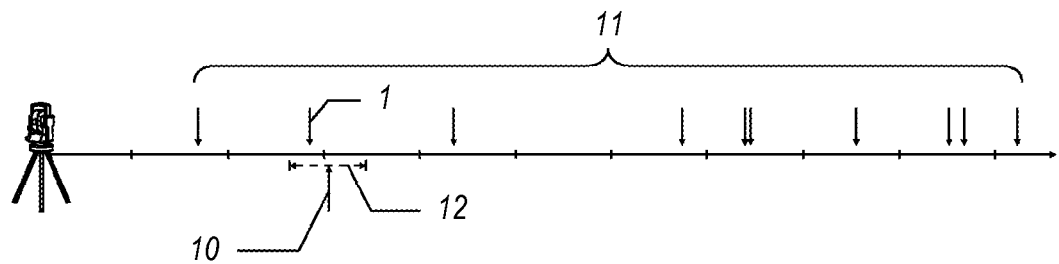
FIG. 4 shows distance axis on which distances measured by the total station in a search operation are plotted as points, and the approximate distance determined is plotted.

Illustrated in FIG. 4 is a diagram with target point candidate distances, measured by the total station, relating to the target point candidates 11, which are respectively plotted on two-dimensional distance beam.

Likewise shown is the approximate distance 10, determined in accordance with the invention, for identifying the target point 1. Also plotted as the target point 1 about the approximate distance 10 is the maximum permissible deviation range 12 thereof for identifying a target point candidate 11. In the case shown, it now follows that the target point 1 would be identified as that target point candidate 11 whose target point candidate distance lies within the permissible deviation range 12 as the sole such distance from the set of all target point candidate distances determined. The position determined with high precision for this candidate can therefore now be assigned to the target point 1 as the target point position being sought.

Figure 5:
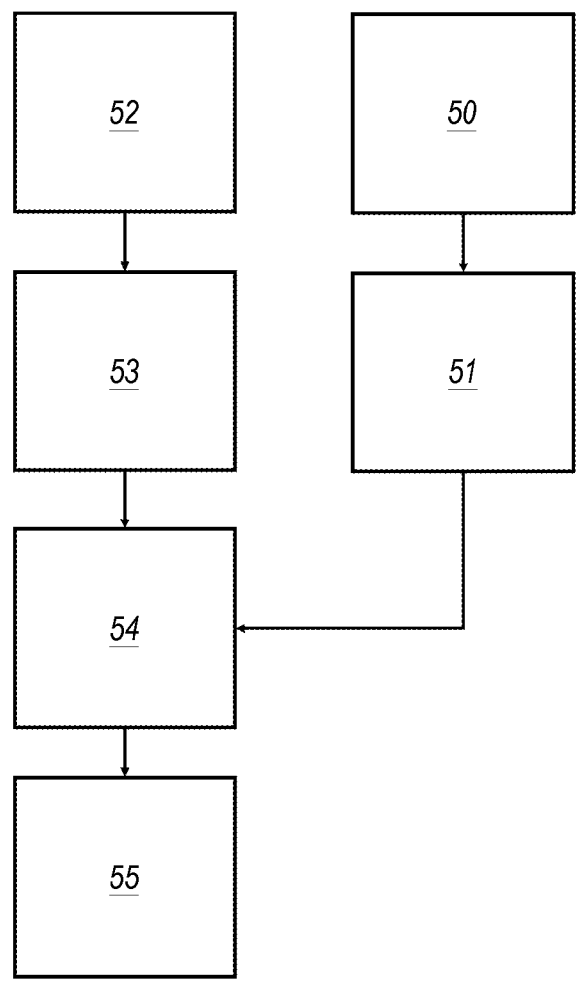
FIG. 5 shows schematically illustrated steps in the inventive position determination method.

FIG. 5 illustrates the steps of an exemplary embodiment of the position determination method.

Here, a radio link is established 50 between the radio module of the total station and the radio module of the data logger, this being designed for remote control of the total station—in the course of the method—within a near, maximum permissible spatial circumcircle around the target point to be measured.

Furthermore, an optoelectronic determination 53 of positions of the target point candidates can be carried out by optoelectronic measurement of target point candidate distances and, in particular, likewise target point candidate angles by the total station in relation to the target point candidates in each case. In particular, these positions can be determined here in the course of an automatic search operation 52 for reflecting objects located in the field of view of the total station, which objects therefore represent target point candidates.

By way of example, in a temporally parallel fashion thereto an approximate distance between the radio module of the total station and the radio module of the data logger is determined 51 according to the invention with the aid of a propagation time of interrogation and/or response signals of the radio link.

Subsequently, target location 54 is executed—that is to say, in particular, the target point is identified from the candidate set—with the aid of the approximate distance, that is to say by using the approximate distance. The position determined with high precision for the target point candidates identified as the target point can now be allocated 55 to the target point position being sought.

Figure 6:
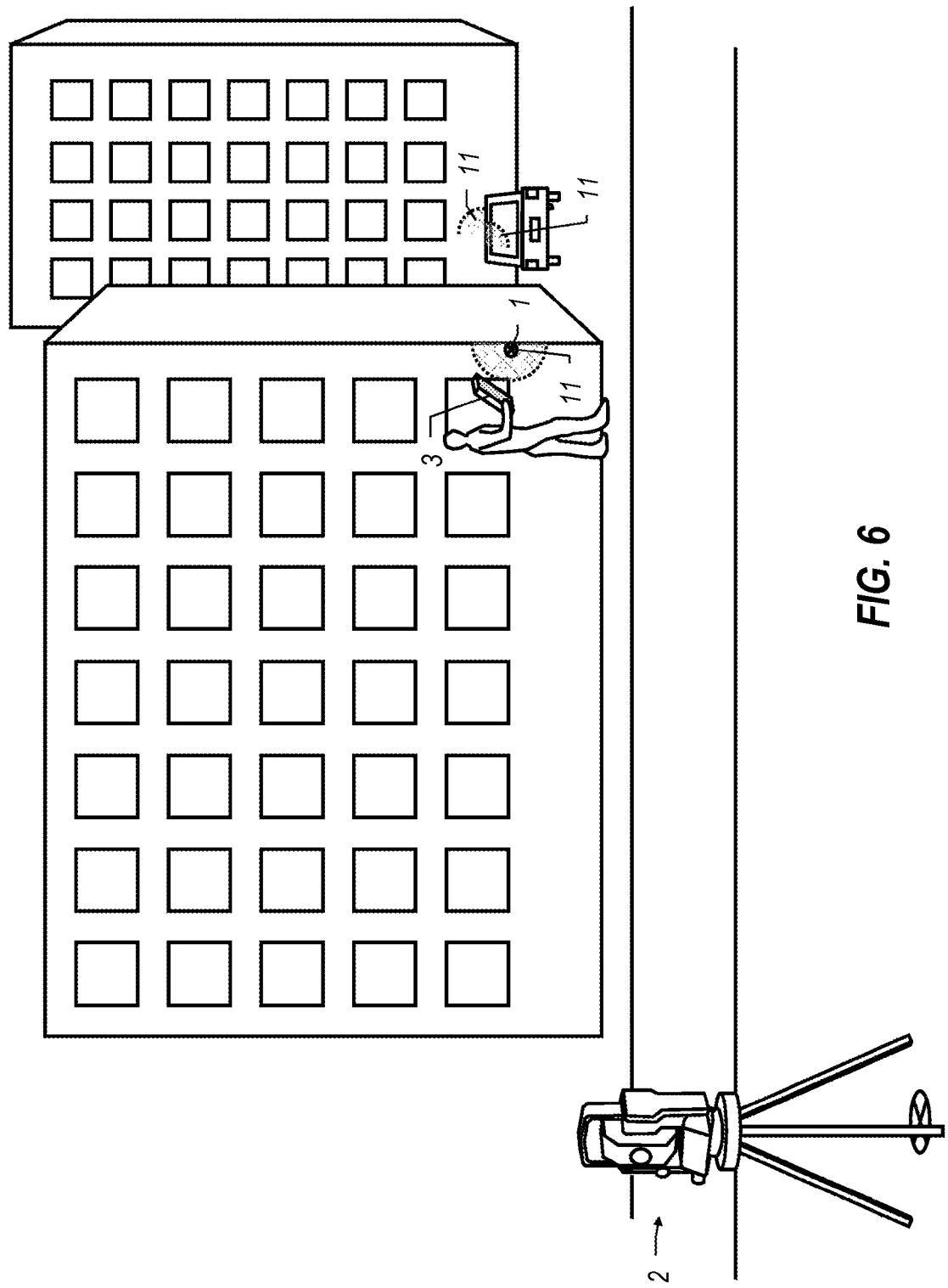
FIG. 6 shows a reflectorless measuring situation.

FIG. 6 shows a reflectorless measuring situation, the aim being to measure the position of a target point 1 on the front house wall with the aid of a total station, set up in the terrain, as a geodetic measuring device 2.

The total station is remotely controlled in this case via a radio link by a handheld data logger as data processing device 3. The data logger is operated by a user who is situated in the immediate vicinity of the target point 1 of the house wall that is to be measured.

This target point 1 is measured by emitting optical radiation from the total station in the direction of this target point 1. Since the beam cross section of the optical radiation is not punctiform, but two-dimensional, in the case shown the measuring radiation is applied not only to the sighted target point 1 of the front house wall, but likewise also to a portion of the rear side of the parked vehicle and to a portion of the wall of the second house located in the background. Consequently, retroreflected portions of the measuring radiation are also respectively received from these different objects, which thereby likewise represent target point candidates 11. It is now possible in principle to use the received measuring radiation to determine the distances both from the actual target point 1 of the front house wall, and from the wall of the rear house as well as from the rear side of the automobile. It is therefore not possible straightaway to assign these determined distances to the respective objects, that is to say which of them are disturbance distances and which of them is the actual distance being sought for the target point 1.

According to the invention, an approximate distance is now determined from the radio signals between the total station and the data logger. Since the data logger user is located near the target point 1—that is to say within a prescribed, maximum permissible spatial circumcircle around the latter—the distance being sought for the target point 1 is identified from the plurality of target point candidate distances determined with the aid of the derived approximate distance. As already described above in more detail, to this end it is possible to compare the target point candidate distances with the approximate distance and, for example, to determine the distance whose value lies closest to the approximate distance as the target point distance to be assigned to the target point 1.

Figure 7:
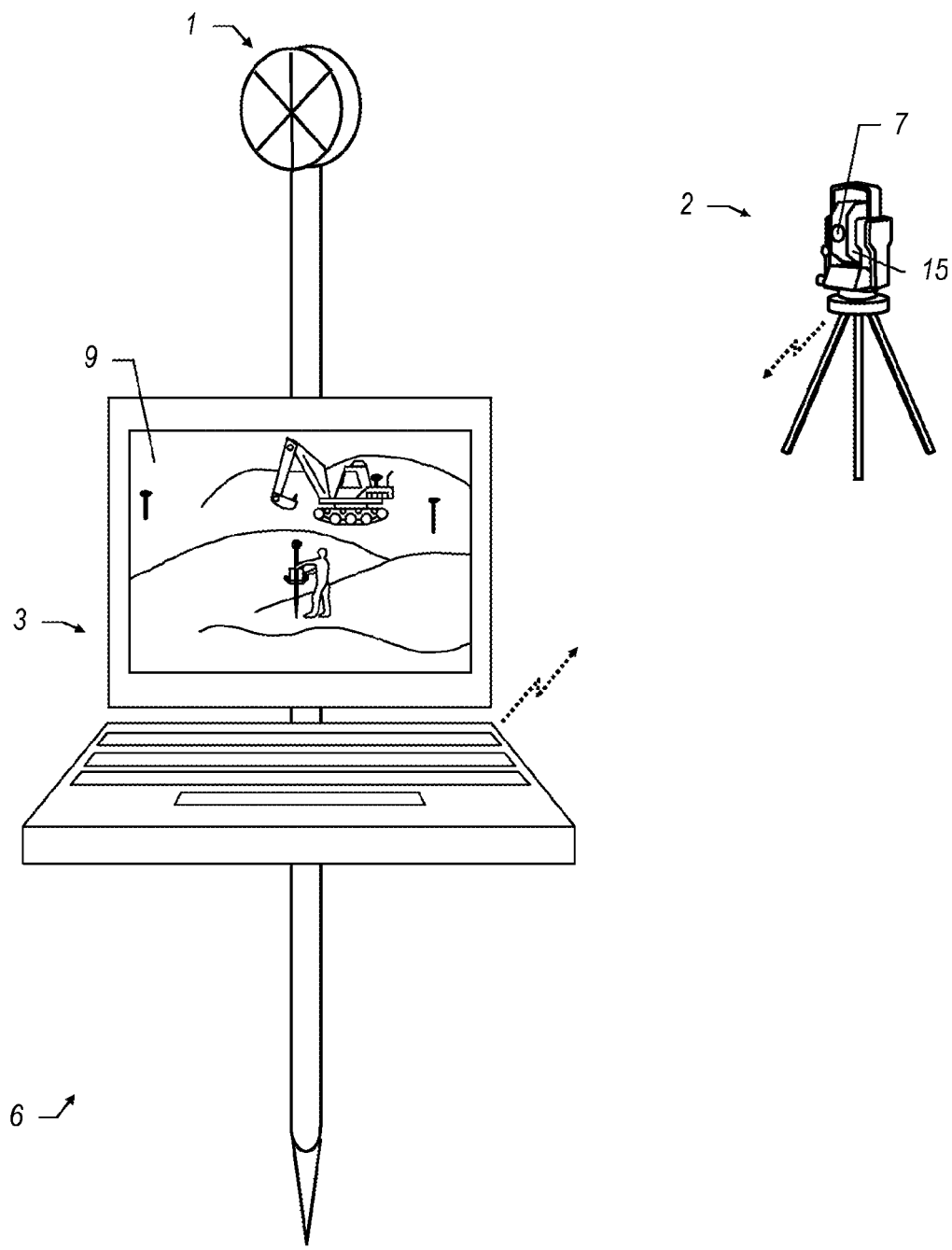
FIG. 7 shows a data logger, slipped onto the target reflector rod, with a display in which an inventively focused live image of the total station camera is shown.

FIG. 7 shows an inventive measuring system 6 comprising a geodetic measuring device 2 designed as a total station, and a handheld data processing device 3. Here, the data processing device 3, which is arranged on a target reflector rod and designed as a data logger, has a display 9 in which an inventively focused live image of a total station camera is displayed. To this end, the total station has as sighting device 7 a camera that can optionally be integrated in a target telescope and has appropriate optics.

The data logger is spatially linked in this case to the target point 1 and is located within a prescribed, relatively narrow circumcircle around the target point 1.

In accordance with the invention, a propagation time of interrogation and/or response signals of the radio link between a first and second radio module of the total station and the data logger, respectively, is used to determine an approximate distance between the two devices, and this approximate distance is used to facilitate detection of the target point 1—in particular for automatically focusing a camera image of the total station.

For example, automatic focusing can be performed as a function of the approximate distance by the focus control 15 for the sighting device 9. The target to be measured can thereby be continuously automatically focused in the sight, and thus be more effectively detected, identified and sighted in the camera image.

In particular, here a focal position of the sighting device optics can be set automatically—in particular by servomotors—in such a way that the sighting device 7 is focused at the approximate distance.

It goes without saying that these figures illustrated are merely schematics of possible exemplary embodiments. The various approaches can equally be combined with one another and with methods of the prior art.

What is claimed is:

1. A position determination method using a geodetic measuring device and a handheld data processing:
    wherein the geodetic measuring device has a distance and angle measurement function configured to determine spatial position of a target point as well as a sighting device having a first radio module, and
    wherein the handheld data processing device has a second radio module, the handheld data processing device being positioned within a circle centered on a target point and having a radius of at most 2 meters,
    wherein the method comprises the steps of:
        establishing, by one or both of the first and second radio modules, a radio link between the first and the second radio modules;
        determining a radio approximate distance between the first and the second radio modules based on a propagation time of interrogation and/or response signals of the radio link,
        determining target point candidate distances between the sighting device and target point candidates that collectively form a candidate set of target point candidates, wherein the target point candidate distances are determined based on reflected optical signals from the target point candidates,
        identifying the target point from the candidate set of target point candidates by filtering the target point candidate distances as a function of the radio approximate distance;
        localizing the target point by displaying, detecting, identifying and/or sighting the target point, by the geodetic measuring device or the handheld data processing device, based on the radio approximate distance, so that a user can easier identify the target point; and
        determining, by the geodetic measuring device or the handheld data processing device, the position of the target point.

2. The position determination method as claimed in claim 1, wherein the geodetic measuring device is a total station or a theodolite and the handheld data processing device is a data logger for the geodetic measuring device.

3. The position determination method as claimed in claim 1, further comprising selecting a subset of the target point candidates whose target point candidate distance values lie within a defined, maximum permissible deviation range around a value of the radio approximate distance, wherein:
    the identified target point is included in the selected subset of the target point candidates; and
    the maximum permissible deviation range is defined:
        as a function of a measuring accuracy for the determination of the radio approximate distance; and/or
        as a function of a position of the handheld data processing device relative to the target point, in particular additionally as a function of the circle.

4. The position determination method as claimed in claim 3, wherein identifying the target point includes identifying the target point candidate from the selected subset of the target point candidates whose target point candidate distance value lies closest to the value of the radio approximate distance.

5. The position determination method as claimed in claim 3, further comprising determining a probability for the identification as the target point for each target point candidate in the selected subset of the target point candidates.

6. The position determination method as claimed in claim 3, wherein determining the target point candidate distances comprises measuring respective distances of the target point candidates in the course of a search, carried out automatically by the geodetic measuring device, of a field of view region for reflecting objects representing the target point candidates.

7. The position determination method as claimed in claim 3, further comprising measuring respective angles of the target point candidates in the course of a search, carried out automatically by the geodetic measuring device, of a field of view region for reflecting objects representing the target point candidates.

8. The position determination method as claimed in claim 3, further comprising assigning to the target point a measured position of the target point candidate identified as the target point.

9. The position determination method as claimed in claim 1, further comprising automatically setting a focal position of an optics of the sighting device such that the sighting device is focused on the radio approximate distance, the sighting device being designed as:
   a target telescope;
   a camera; or
   a target telescope with a camera aligned coaxially therewith or parallel thereto.

10. The position determination method as claimed in claim 1, further comprising automatically setting a focal position of an optics of the sighting device by servomotors such that the sighting device is focused on the radio approximate distance, the sighting device being designed as a target telescope with a camera aligned coaxially therewith or parallel thereto and an acquired camera image being displayed on a display of the handheld data processing device.

11. The position determination method as claimed in claim 1, further comprising automatically focusing the sighting device as a function of the radio approximate distance.

12. A geodetic measuring system, comprising:
   a geodetic measuring device, including:
      a first radio module;
      a distance and angle measurement function configured to determine spatial positions of reflecting objects that represent target point candidates of a candidate set; and
      a sighting device; and
   a handheld data processing device spatially linkable to the target point including a second radio module configured to communicate with the first radio module;
   wherein:
      the geodetic measuring device or the handheld data processing device is configured to determine a radio approximate distance from the first to the second radio module with the aid of a propagation time of interrogation and/or response signals of a radio link between the first and the second radio modules;
      the geodetic measuring device or the handheld data processing device is configured to determine target point candidate distances between the sighting device and the target point candidates of the candidate set, wherein the target point candidate distances are determined based on reflected optical signals from the target point candidates;
      the geodetic measuring device or the handheld data processing device is configured to localize the target point by identifying the target point from the candidate set based on the radio approximate distance so that a user can easier identify the target point;
      the geodetic measuring system further comprises a focus control for the sighting device for automatic focusing as a function of the radio approximate distance; and
      the geodetic measuring system further comprises a unit for identifying the target point from the candidate set based on the radio approximate distance, wherein the unit for identifying is designed as an arithmetic logic unit for identifying the target point from the candidate set by filtering the target point candidate distances as a function of the radio approximate distance.

13. The geodetic measuring system as claimed in claim 12, wherein the geodetic measuring device is a total station or a theodolite and is configured to perform a search function for target point candidates located in a field of view region.

14. The geodetic measuring system as claimed in claim 12, wherein the handheld data processing device is a data logger and is configured to perform a window control function for the geodetic measuring device.

15. The geodetic measuring system as claimed in claim 12, wherein the arithmetic logic unit is integrated in the geodetic measuring device.

16. The geodetic measuring system as claimed in claim 15, wherein the focus control is configured to automatically set a focal position of an optics of the sighting device in such a way that the sighting device is focused on the radio approximate distance, the sighting device being designed as:
   a target telescope;
   a camera; or
   a target telescope with a camera aligned coaxially therewith or parallel thereto.

17. The geodetic measuring system as claimed in claim 15, wherein the focus control is configured to automatically set by means of servomotors a focal position of an optics of the sighting device in such a way that the sighting device is focused on the radio approximate distance, the sighting device being designed as:
   a target telescope;
   a camera; or
   a target telescope with a camera aligned coaxially therewith or parallel thereto,
   wherein the camera is connected to a display of the handheld data processing device for presenting an acquired camera image on said display.

18. The geodetic measuring system as claimed in claim 15, wherein:
   the target point is designed as a target reflector and is fastened on a reflector rod, and
   the reflector rod has a holder for slipping on the handheld data processing device.

19. The handheld data processing device for the measuring system as claimed in claim 15, the handheld data processing device comprising:
   the second radio module; and
   the unit for identifying;
   wherein the handheld data processing device is configured to remotely control and acquire data from the geodetic measuring device and the handheld data processing device is spatially linkable to the target point to be measured by the geodetic measuring device.

20. A geodetic measuring device, comprising:
   a first radio module;
   a distance and angle measurement function configured to determine spatial positions of reflecting objects that represent target point candidates of a candidate set; and
   a sighting device;
   wherein:
      the geodetic measuring device is configured to determine a radio approximate distance from the first radio module to a second radio module of a handheld data processing device spatially linked to a target point with the aid of a propagation time of interrogation and/or response signals of a radio link between the first and the second radio modules;
      the geodetic measuring device is configured to determine target point candidate distances between the sighting device and the target point candidates of the candidate set, wherein the target point candidate distances are determined based on reflected optical signals from the target point candidates;

the geodetic measuring device is configured to localize the target point by identifying the target point from the candidate set based on the radio approximate distance so that a user can easier identify the target point; and the geodetic measuring device further comprises a unit for identifying the target point from the candidate set based on the radio approximate distance, wherein the unit for identifying is designed as an arithmetic logic unit for identifying the target point from the candidate set by filtering the target point candidate distances as a function of the radio approximate distance.

21. A geodetic measuring device according to claim 20, wherein the geodetic measuring device is a total station or a theodolite and is configured to perform a search function for target point candidates located in a field of view region.

22. A geodetic measuring device according to claim 20, further comprising a focus control for the sighting device for automatic focusing as a function of the radio approximate distance.

* * * * *